United States Patent
Kokura

(10) Patent No.: US 11,647,152 B2
(45) Date of Patent: May 9, 2023

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Toru Kokura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 340 days.

(21) Appl. No.: 16/893,634

(22) Filed: Jun. 5, 2020

(65) Prior Publication Data

US 2020/0396415 A1 Dec. 17, 2020

(30) Foreign Application Priority Data

Jun. 12, 2019 (JP) .............................. JP2019-109623

(51) Int. Cl.
*H04N 7/01* (2006.01)
*H04N 5/247* (2006.01)

(52) U.S. Cl.
CPC ........... *H04N 7/0117* (2013.01); *H04N 5/247* (2013.01)

(58) Field of Classification Search
CPC ...... G06N 3/0454; G06N 3/08; G06T 3/4046; G06T 3/4053; H04N 1/3935
See application file for complete search history.

(56) References Cited

U.S. PATENT DOCUMENTS

| | | | | |
|---|---|---|---|---|
| 9,740,933 B2* | 8/2017 | Demizu | ................. | G06V 20/00 |
| 10,467,729 B1* | 11/2019 | Perera | .................... | G06T 3/4046 |
| 10,789,472 B1* | 9/2020 | Hedley | ................. | G06V 20/20 |
| 2011/0134285 A1* | 6/2011 | Kanamori | ............ | H04N 5/2628 348/E5.051 |
| 2011/0211765 A1* | 9/2011 | Nagumo | ................. | G06T 5/003 382/254 |
| 2011/0235934 A1 | 9/2011 | Takahashi | | |
| 2012/0169848 A1* | 7/2012 | Bae | ...................... | H04N 13/254 348/222.1 |
| 2012/0294512 A1* | 11/2012 | Matsuda | ............... | G06T 3/4053 382/155 |
| 2013/0141597 A1* | 6/2013 | Lee | ......................... | G06T 7/194 348/222.1 |
| 2015/0381968 A1* | 12/2015 | Arora | ................... | H04N 13/275 348/47 |
| 2016/0037152 A1* | 2/2016 | Kim | ....................... | G06T 7/593 348/47 |
| 2016/0344943 A1* | 11/2016 | Lee | .................... | H04N 5/23235 |
| 2018/0247120 A1* | 8/2018 | Demizu | .......... | G08B 13/19682 |
| 2019/0138838 A1* | 5/2019 | Liu | ...................... | G06V 10/764 |

(Continued)

FOREIGN PATENT DOCUMENTS

EP        3748572 A1 * 12/2020 ............... G06N 3/04
JP        2011211437 A   10/2011

*Primary Examiner* — Mainul Hasan
(74) *Attorney, Agent, or Firm* — Rossi, Kimms & McDowell LLP

(57) ABSTRACT

An image processing apparatus obtains a first image of an object based on image capturing by an image capturing apparatus, obtains a parameter concerning a resolution of the first image, and generates a second image of the object having a resolution higher than the resolution of the first image in response to input of input data including the obtained first image and the obtained parameter.

18 Claims, 13 Drawing Sheets

(56) References Cited

U.S. PATENT DOCUMENTS

| | | | |
|---|---|---|---|
| 2019/0378304 A1* | 12/2019 | Ando | G06V 10/454 |
| 2020/0098127 A1* | 3/2020 | Namiki | G06T 5/002 |
| 2021/0342976 A1* | 11/2021 | Navarrete Michelini | G06T 3/20 |
| 2021/0407042 A1* | 12/2021 | Berthelot | G06T 3/4053 |

* cited by examiner

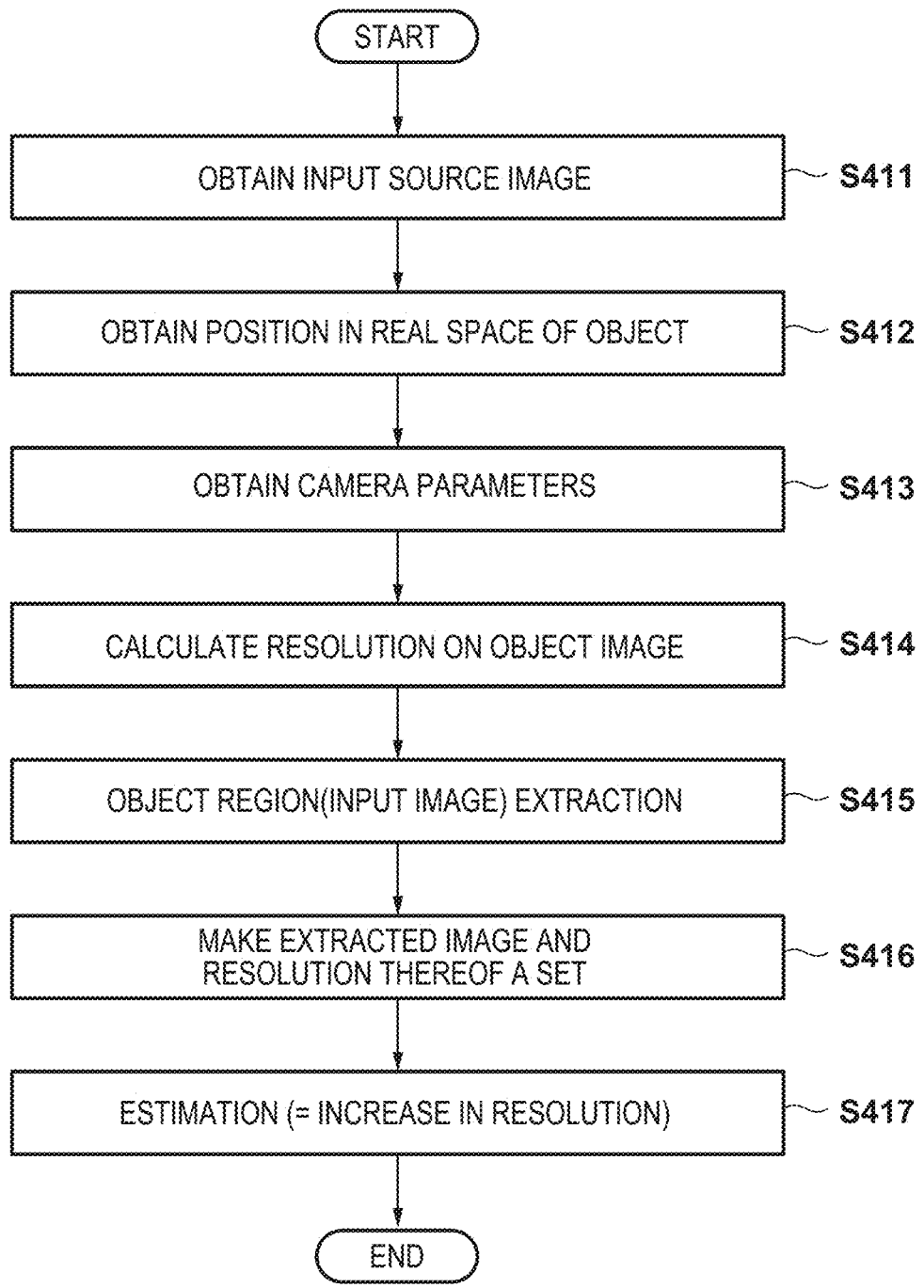

FIG. 9
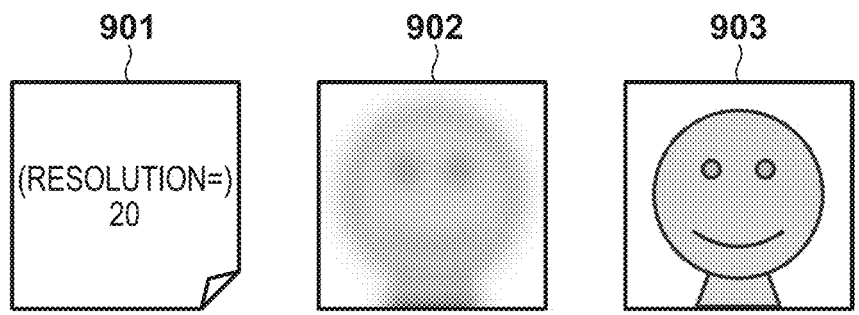
EXAMPLE 1 OF LEARNING DATA — 901 (RESOLUTION=) 20 — 902 — 903
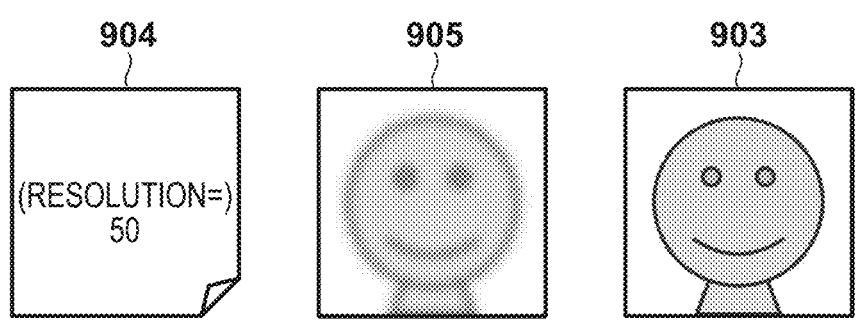
EXAMPLE 2 OF LEARNING DATA — 904 (RESOLUTION=) 50 — 905 — 903

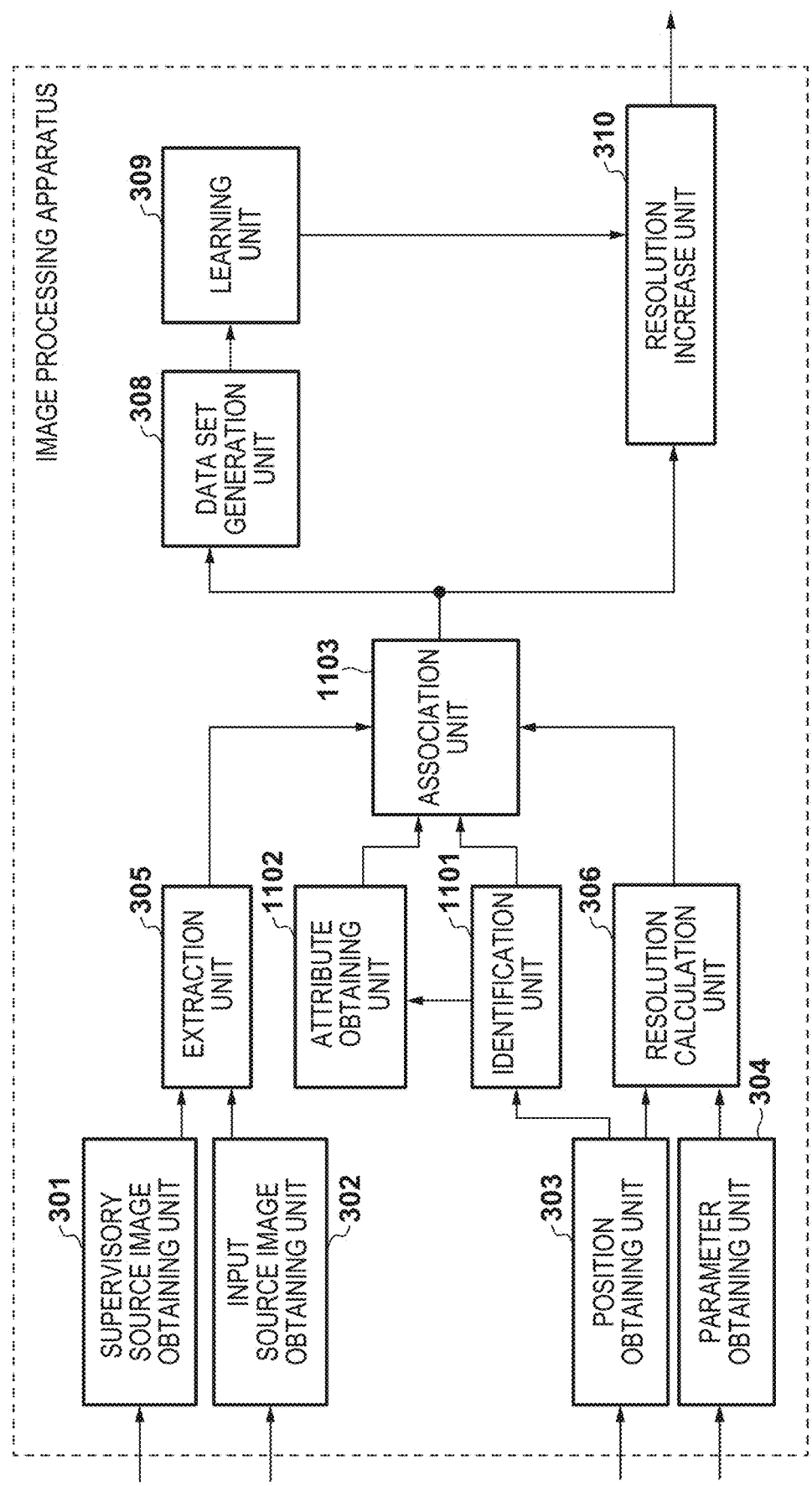

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

There is provided a method based on machine learning as a technique of increasing the resolution of a low-resolution image. This processing is performed by, for example, the following two steps. First, a plurality of pairs of high-resolution supervisory images and deteriorated images obtained by reducing the resolutions of the supervisory images are prepared, and then a function of mapping the images is learned. Second, a low-resolution input image different from those used for learning is input to the obtained function, and a high-resolution image corresponding to the input image is estimated (Japanese Patent Laid-Open No. 2011-211437).

In recent years, it is necessary to further improve the accuracy of processing of increasing the resolution of an input image based on machine learning. For example, in the conventional technique, if the resolution of an object in a supervisory image used for leaning and the resolution of the object in an input image as a resolution increase target are varied, the accuracy of the resolution increase processing may degrade.

SUMMARY OF THE INVENTION

According to one aspect of the present invention, there is provided an image processing apparatus comprising: a first obtaining unit configured to obtain a first image of an object based on image capturing by an image capturing apparatus; a second obtaining unit configured to obtain a parameter concerning a resolution of the first image; and a generation unit configured to generate a second image of the object having a resolution higher than the resolution of the first image in response to input of input data including the obtained first image and the obtained parameter.

According to another aspect of the present invention, there is provided an image processing method comprising: obtaining a first image of an object based on image capturing by an image capturing apparatus; obtaining a parameter concerning a resolution of the first image; and generating a second image of the object having a resolution higher than the resolution of the first image in response to input of input data including the obtained first image and the obtained parameter.

According to another aspect of the present invention, there is provided a non-transitory computer-readable storage medium storing a program for causing a computer to execute an image processing method, the method comprising: obtaining a first image of an object based on image capturing by an image capturing apparatus; obtaining a parameter concerning a resolution of the first image; and generating a second image of the object having a resolution higher than the resolution of the first image in response to input of input data including the obtained first image and the obtained parameter.

Further features of the present invention will become apparent from the following description of exemplary embodiments with reference to the attached drawings.

BRIEF DESCRIPTION OF THE DRAWINGS

FIG. 4B is a flowchart illustrating estimation processing by the image processing apparatus according to the first embodiment;

FIG. 9 is a view showing examples of data used for learning;

FIG. 11 is a block diagram showing an example of the functional arrangement of an image processing apparatus according to the third embodiment;

DESCRIPTION OF THE EMBODIMENTS

Figure 1:
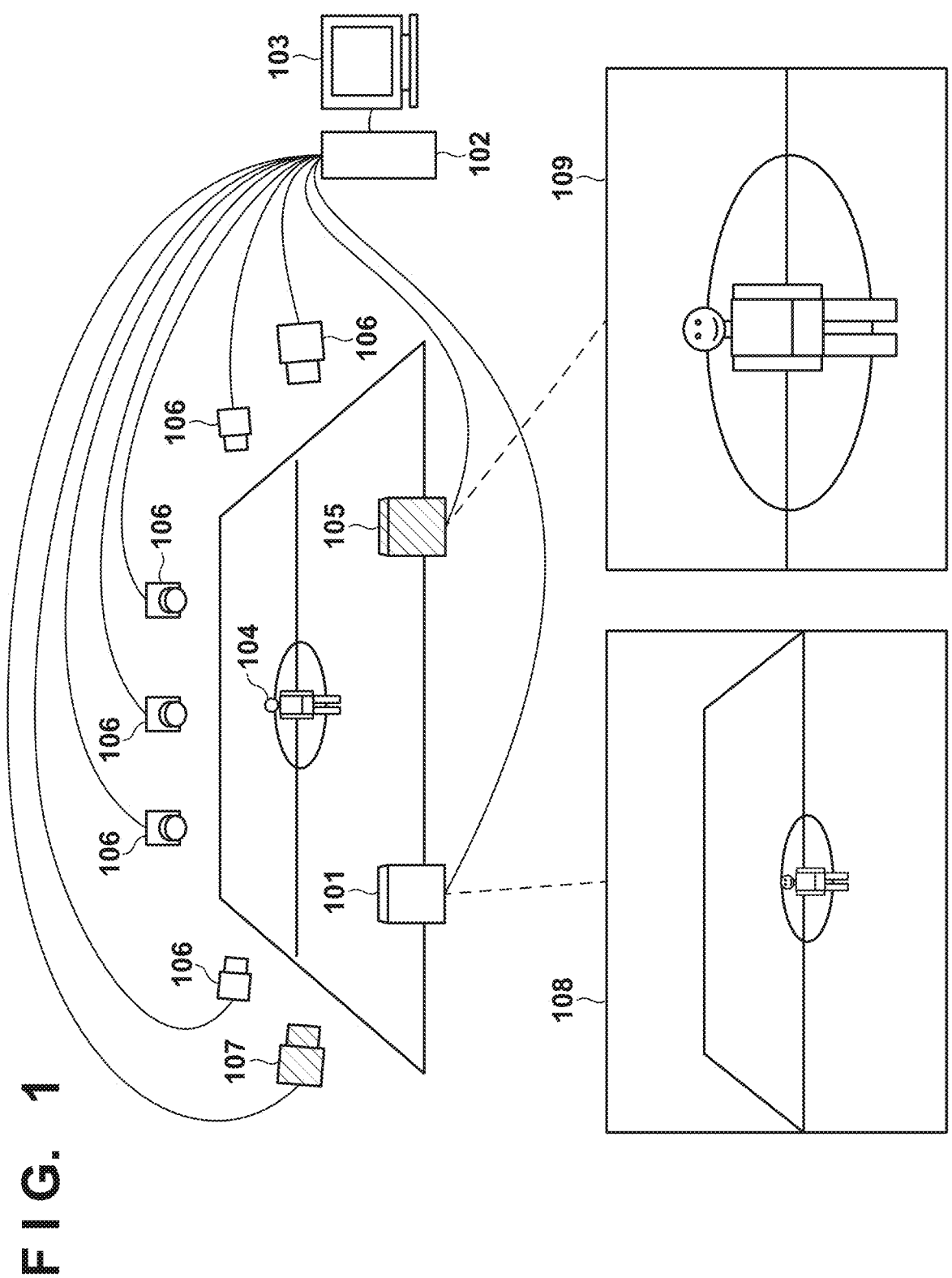
FIG. 1 is a schematic view showing the arrangement of an image capturing system according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<Overall Arrangement of Image Capturing System>

The first embodiment will describe an arrangement of performing machine learning (to be referred to as learning hereinafter) and estimation using information of the resolution of an image. The machine learning includes learning of various methods such as supervised learning, unsupervised learning, and reinforcement learning. In the following embodiment, a case in which among the machine learning methods, deep learning using a neural network is performed will be described as an example. Note that the first embodiment will provide a description using, as an example, an arrangement of setting the face of a person (for example, an athlete) as an object and acquiring a supervisory image for learning using an image capturing apparatus capable of capturing an object at a high resolution.

FIG. 1 is a schematic view showing an example of the arrangement of an image capturing system according to the first embodiment. Image capturing apparatuses 101 and 105 are arranged in a stadium. For example, an image 108 obtained by capturing an athlete (object 104) is obtained from the image capturing apparatus 101. The image capturing apparatus 105 captures a supervisory image for learning a parameter to be used for estimation processing for increasing the resolution of the image obtained by image capturing of the image capturing apparatus 101. The supervisory image includes a captured image of the object. The image capturing apparatus 105 includes a lens with a focal length longer than that of the image capturing apparatus 101, and can capture an image 109 whose angle of view is narrower than that of the image 108 but on which the resolution of the object 104 is higher than that on the image 108.

An image processing apparatus 102 increases the resolution of the image obtained by the image capturing apparatus 101 to be equal to that of the high-resolution supervisory image, and displays the thus obtained image on a display device 103. Note that there may exit a plurality of image capturing apparatuses 106 each of which captures the object at a resolution as low as that of the image capturing apparatus 101 and a plurality of image capturing apparatuses 107 each of which captures the object at a resolution as high as that of the image capturing apparatus 105. FIG. 1 exemplifies a sport scene but the present invention is also applicable to a general scene in which an object is captured at a different resolution. The image capturing system according to the first embodiment is also applicable to a case in which the object is an object other than a face image. Furthermore, the image processing apparatus 102 may generate a plurality of processed images by performing resolution increase processing for each of a plurality of images based on image capturing by the plurality of image capturing apparatuses 101 to 107. Then, the image processing apparatus 102 may generate, using the plurality of processed images by a known virtual viewpoint image (free-viewpoint video) generation technique, a virtual viewpoint image corresponding to the position and direction of a virtual viewpoint designated by the user. Note that the image processing apparatus 102 may output the plurality of processed images to another image generation apparatus, and the other image generation apparatus may generate a virtual viewpoint image.

In the above description, an image capturing apparatus with a long focal length is used as the image capturing apparatus 105 for acquiring a high-resolution supervisory image. However, an image capturing apparatus having a large number of pixels may be used. In addition, if the object captured on the near side of a screen is in focus, the object is captured at a high resolution, as compared with a case in which the object is captured on the far side. Therefore, an image of the object captured on the near side of the screen of the image capturing apparatus 101 may be used as a supervisory image.

Figure 2:
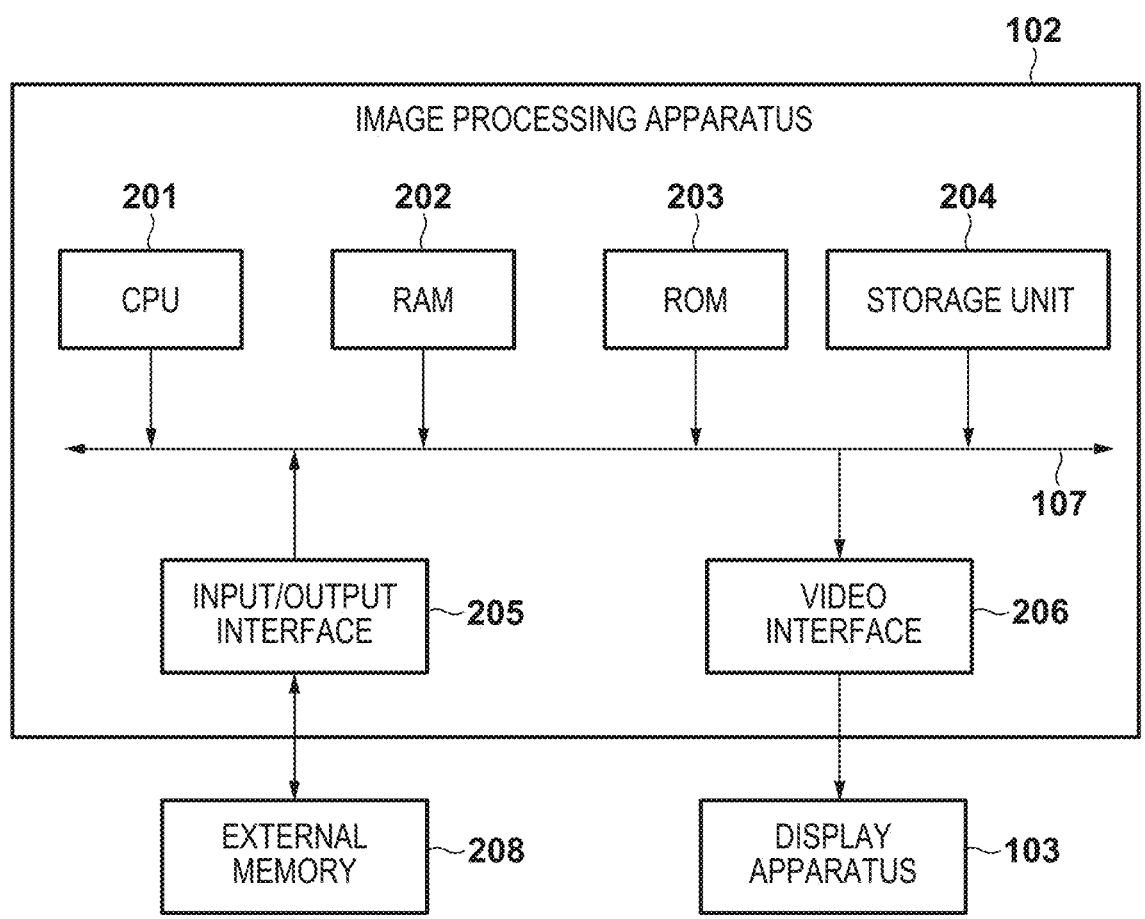
FIG. 2 is a block diagram showing an example of the hardware arrangement of an image processing apparatus according to the first embodiment.

FIG. 2 is a block diagram showing an example of the hardware arrangement of the image processing apparatus 102 according to the first embodiment. The image processing apparatus 102 includes a CPU 201, a RAM 202, a ROM 203, a storage unit 204, an input/output interface 205, a video interface 206, and a system bus 207. An external memory 208 is connected to the input/output interface 205 and the video interface 206. The display device 103 is connected to the video interface 206.

The CPU 201 is a processor that comprehensively controls the respective constituent elements of the image processing apparatus 102. The RAM 202 is a memory functioning as the main memory and the work area of the CPU 201. The ROM 203 is a memory that stores a program and the like used for processing in the image processing apparatus 102. The CPU 201 executes various processes (to be described later) by executing the program stored in the ROM 203 using the RAM 202 as the work area. The storage unit 204 stores image data to be used for the processing in the image processing apparatus 102 and a parameter for processing. As the storage unit 204, for example, an HDD, an optical disk drive, a flash memory, or the like can be used.

The input/output interface 205 is a serial bus interface such as USB or IEEE1394. The image processing apparatus 102 can obtain processing target image data from the external memory 208 (for example, a hard disk, a memory card, a CF card, an SD card, or a USB memory) via the input/output interface 205. Furthermore, the image processing apparatus 102 can store the processed image in the external memory 208 via the input/output interface 205. The video interface 206 is a video output terminal such as DVI or HDMI®. The image processing apparatus 102 can output image data processed by the image processing apparatus 102 to the display device 103 (an image display device such as a liquid crystal display) via the video interface 206. Note that constituent elements other than those described above also exist as the constituent elements of the image processing apparatus 102. However, they are not included in the gist of the present invention, and a description thereof will be omitted.

In general, in a learning type resolution increase method, a plurality of pairs of high-resolution supervisory images and deteriorated images obtained by reducing the resolutions of the supervisory images are prepared, and a function of mapping the supervisory image and the deteriorated image is learned. A low-resolution input image different from those used for learning is input to the function obtained by learning, thereby obtaining an output image by increasing the resolution of the input image.

In the method described in Japanese Patent Laid-Open No. 2011-211437, various kinds of natural images are used as supervisory images so as to handle an arbitrary input image. Therefore, images of various categories are used as supervisory images. Furthermore, the resolution of the object on the image is varied in the supervisory image used for learning, and the resolution of the object on the image is also varied with respect to the input image as a resolution increase target.

If images of various categories are used as supervisory images, when a face image of an athlete is input, for example, an error in which the feature of an image of another category such as the learned face of a politician is estimated occurs, resulting in a degradation of the accuracy of the resolution increase processing. Especially when the number of supervisory data is insufficient, or the categories of supervisory data are biased, if the number of supervisory images of the same category as that of the input image is insufficient, it is difficult to estimate the feature of the category. In this embodiment, the image capturing apparatus 105 captures the same object as that of the input image or the object of the same category as that of the input image, and the thus obtained image is used as a supervisory image. This enables a learning unit 309 to sufficiently perform learning using only images of the same category as that of the input image. As a result, an error in which the feature of another category is estimated, as described above, is reduced or eliminated.

Figure 5:
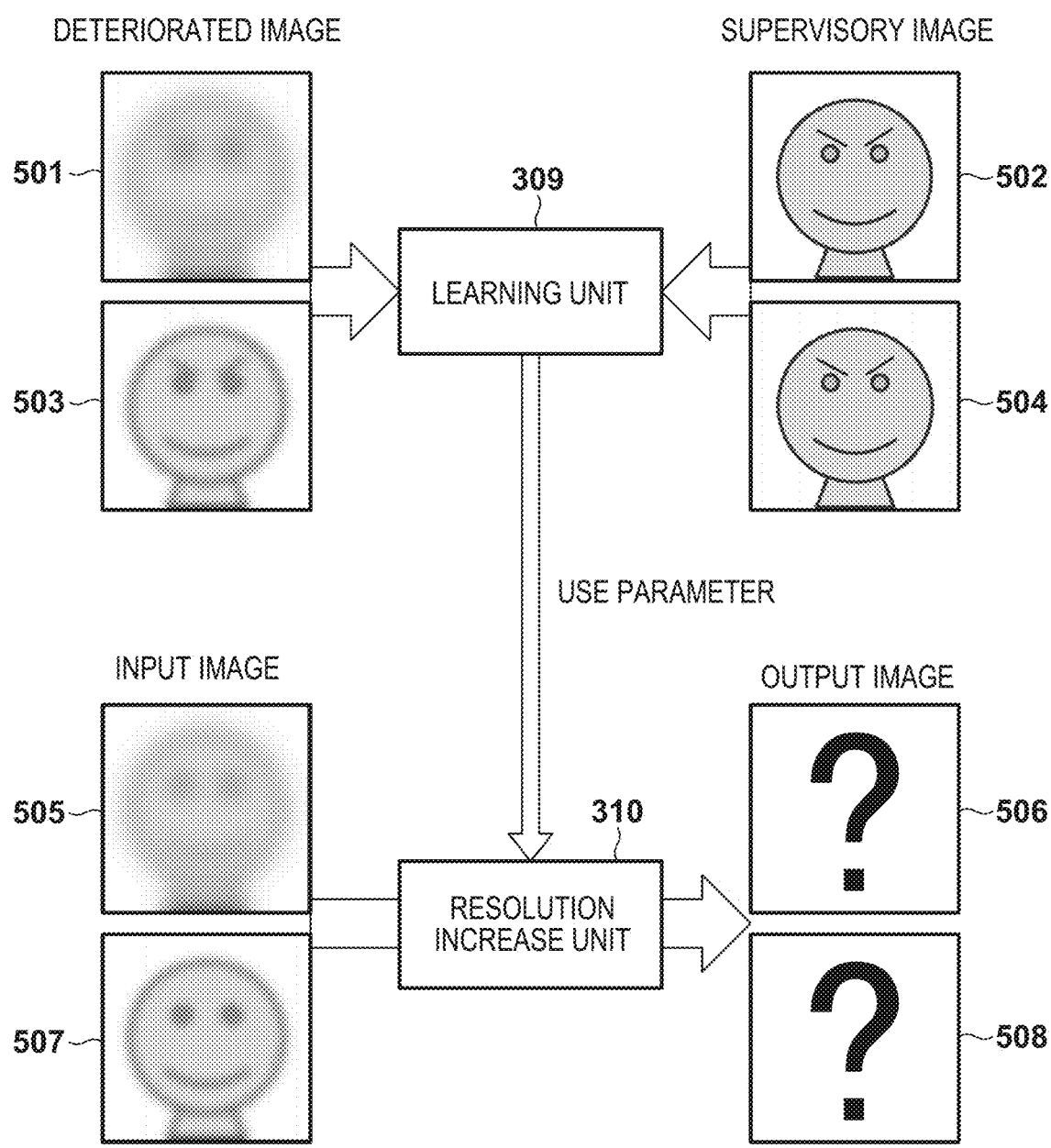
FIG. 5 is a view showing a general procedure of resolution increase processing.

Next, a problem arising when the resolution of the object in the input image as a resolution increase target is varied will be described. FIG. 5 is a view showing a procedure of performing learning and resolution increase processing using acquired images (images of the same category as that of the input image). The resolution of a captured supervisory image is reduced to obtain a deteriorated image. Next, the learning unit 309 is made to learn a function of mapping the low-resolution deteriorated image and the high-resolution supervisory image. A parameter of a neural network obtained as a result of learning will be referred to as a weight parameter hereinafter. FIG. 5 shows, as pairs of deteriorated images and supervisory images, a pair of a deteriorated image 501 and a supervisory image 502 and a pair of a deteriorated image 503 and a supervisory image 504. Based on the weight parameter obtained by learning, a resolution increase unit 310 increases the resolution of a low-resolution input image 505 to output an output image 506, and increases the resolution of a low-resolution input image 507 to output an output image 508.

Depending on whether the object (athlete) is captured on the near side or the far side of the screen, the resolution of the object on the captured image changes. Therefore, images having different resolutions like the input images 505 and 507 are input to the resolution increase unit 310. To cope with the various resolutions, at the time of learning, deteriorated images having resolutions that can be input are prepared to perform learning. However, by learning the deteriorated images having the plurality of resolutions, estimation becomes unstable, thereby degrading the accuracy by including blurring or ringing in an output image.

In this case, a behavior in the resolution increase unit 310 may be as follows. First, the resolution increase unit 310 estimates any one of learned resolutions corresponding to the resolution of the input image 507. Next, the resolution increase unit 310 adds a high-frequency component corresponding to the resolution, and increases the resolution. However, if an error occurs in estimation of the resolution, an inappropriate high-frequency component is added and the accuracy of estimation thus degrades.

Figure 6:
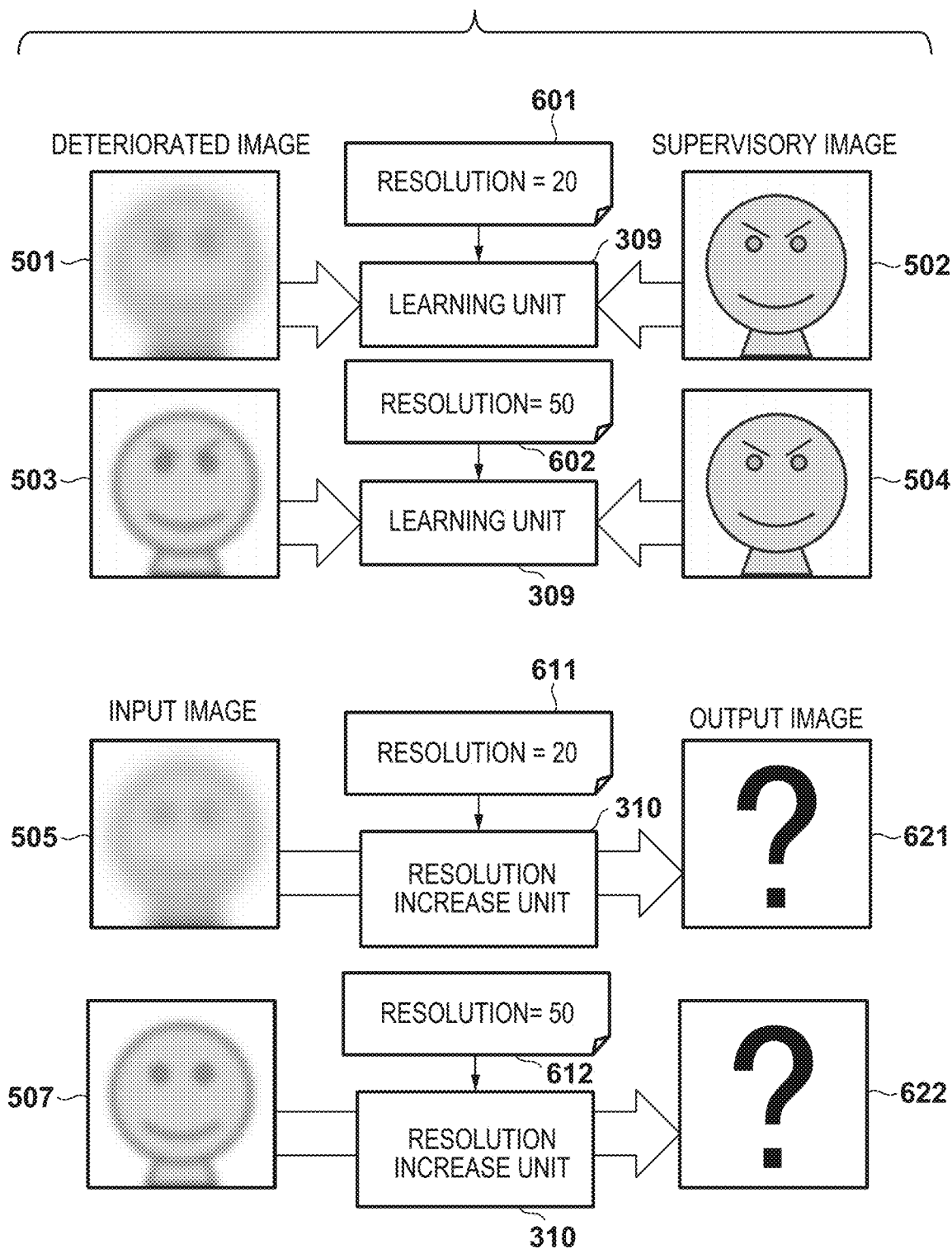
FIG. 6 is a view for explaining the resolution increase processing according to the first embodiment.

FIG. 6 shows an overview of learning and resolution increase processing according to this embodiment for solving the problem associated with images having various resolutions. The learning unit 309 is provided with pieces 601 and 602 of information each indicating the resolution of the object on each deteriorated image in addition to the deteriorated images 501 and 503 and the supervisory images 502 and 504, and learns a weight parameter using these data. That is, the learning unit 309 performs learning of an estimation unit (for example, a neural network) for increasing the resolution of the input image using the supervisory image, the deteriorated image, and resolution information indicating the resolution of the object on the deteriorated image. Furthermore, the resolution increase unit 310 inputs the input image and the resolution information of the input image to the estimation unit learned by the learning unit 309, and obtains an image by increasing the resolution of the input image. In the example shown in FIG. 6, the resolution increase unit 310 is provided with pieces 611 and 612 of information each indicating the resolution of the object on each input image in addition to the input images 505 and 507, and increases the resolution of each input image using these data. As described above, using the resolution of the object on each input image, the resolution increase unit 310 suppresses an error of the estimation of the resolution of the input image. As a result, even if the input images include images having various resolutions, the resolution increase unit 310 can increase the resolution with high accuracy. Note that the pieces 601, 602, 611, and 612 of information input together with the images may be parameters each directly indicating the resolution of the object on the image, or other pieces of information each concerning the resolution. For example, a parameter indicating the position of the object, a parameter indicating the distance between the position of the object and the position of the image capturing apparatus, a parameter indicating the resolution of the image capturing apparatus (for example, a parameter indicating the angle of view of the image capturing apparatus, a parameter indicating the focal length of the imaging lens, or a parameter indicating the number of pixels of an image sensor), or the like may be input.

Figure 3:
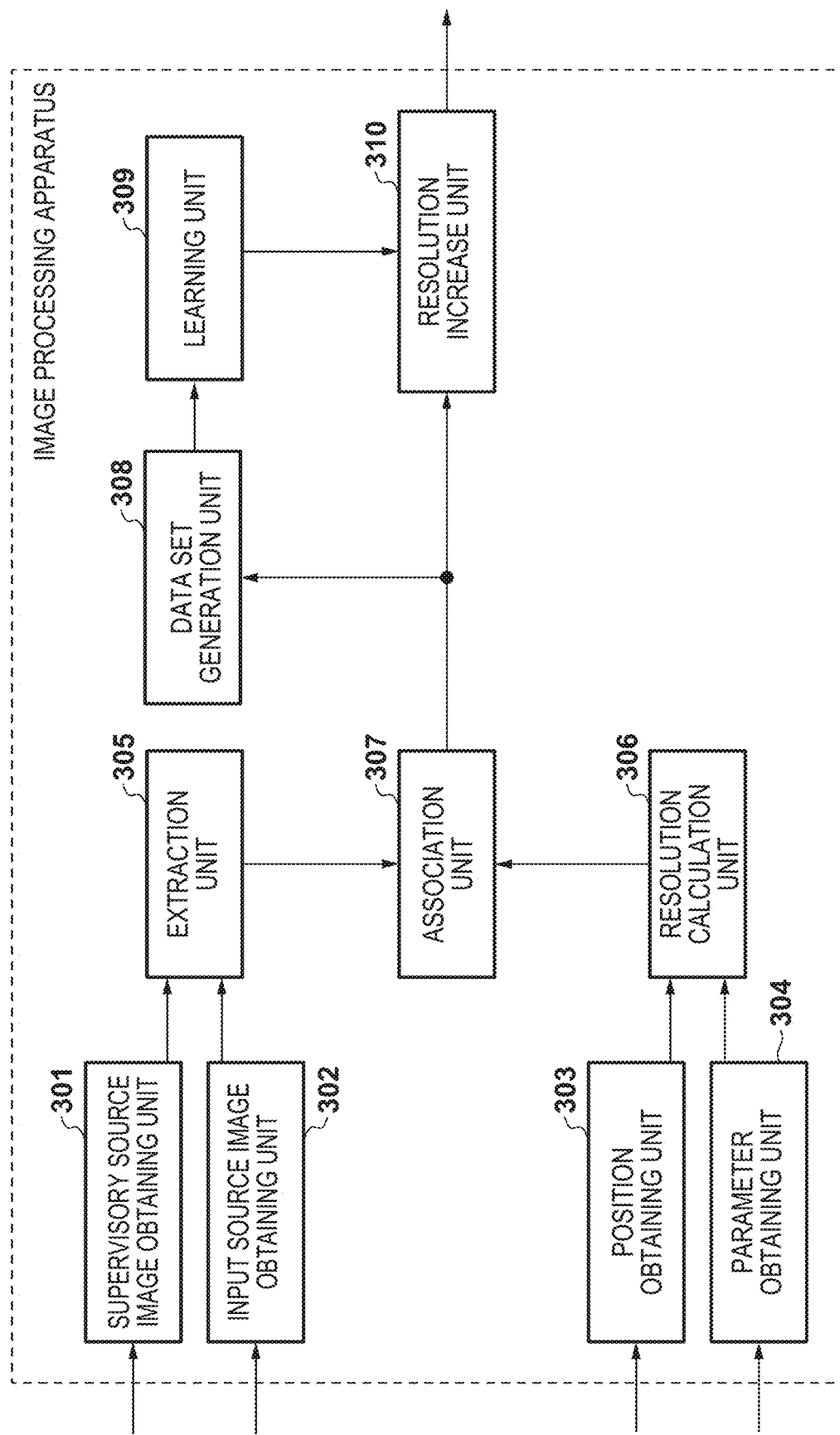
FIG. 3 is a block diagram showing an example of the functional arrangement of the image processing apparatus according to the first embodiment.
Figure 4A:
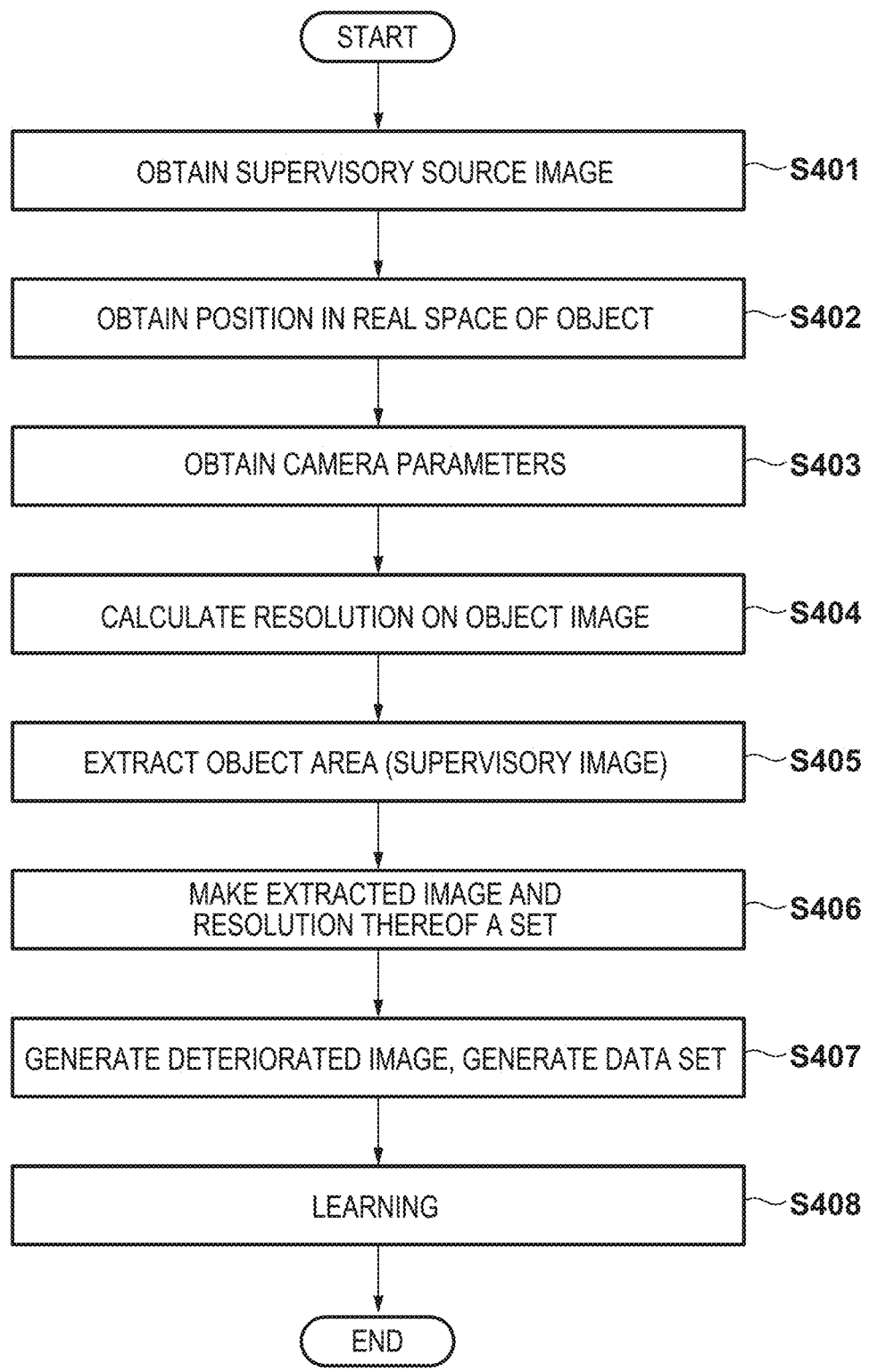
FIG. 4A is a flowchart illustrating learning processing by the image processing apparatus according to the first embodiment.

The functional arrangement and processing of the image processing apparatus 102 according to the first embodiment will be described below with reference to FIGS. 3, 4A, and 4B. FIG. 3 is a block diagram showing an example of the functional arrangement of the image processing apparatus 102. FIG. 4A is a flowchart illustrating learning processing by the image processing apparatus 102 according to the first embodiment. FIG. 4B is a flowchart for explaining estimation processing (resolution increase processing) by the image processing apparatus 102 according to the first embodiment. In the image processing apparatus 102, the CPU 201 functions as each component shown in FIG. 3 by executing the program stored in the ROM 203 using the RAM 202 as the work memory, and executes a series of processes shown in the flowcharts of FIGS. 4A and 4B. Note that not all processes to be described below need to be executed by the CPU 201, and the image processing apparatus 102 may be configured to execute some or all of the processes by one or a plurality of processing circuits other than the CPU 201. The procedure of the processes executed by the respective components will be described below.

In step S401, a supervisory source image obtaining unit 301 obtains a supervisory source image from the storage unit 204 or the image capturing apparatus 105 that captures the object at a high resolution. The supervisory source image obtaining unit 301 supplies the obtained supervisory source image to an extraction unit 305. In step S402, a position obtaining unit 303 obtains the position of the object in a real space in the supervisory source image. The position of the object in the real space can be obtained based on a triangulation principle or a three-dimensional shape estimation method by capturing the object from a plurality of positions, as shown in FIG. 1. Note that the position of the object in the real space may be obtained using an additional sensor such as a depth camera, a GPS, an electro-optical distance measuring instrument, or a gyro sensor. Alternatively, the three-dimensional position of the object may be obtained by assuming that the object exists on the floor surface, and projecting the object on the floor surface. The position obtaining unit 303 outputs the obtained position of the object in the real space to a resolution calculation unit 306.

In step S403, a parameter obtaining unit 304 obtains camera parameters such as a focal length and a camera position (the position of the camera in the real space) with respect to the image capturing apparatus 105. The parameter obtaining unit 304 outputs the obtained camera parameters to the resolution calculation unit 306. In step S404, the resolution calculation unit 306 calculates the resolution of the object on the supervisory source image based on the camera parameters and the position of the object in the real space. In this embodiment, the number n of pixels in the vertical or horizontal direction of a region (the region of the object on the image) occupied by a face on the image is set as the resolution of the object on the image. Resolution information (the number n of pixels) indicating the resolution (the size of the region occupied by an image of the object on the image) of the object on the image is calculated by:

$$n = \frac{f}{d} \cdot \frac{a}{s} \cdot m \quad (1)$$

where f represents the focal length, d represents the distance from the image capturing apparatus to the object (obtained from the camera position of the camera parameters and the position of the object obtained by the position obtaining unit 303), a represents the size of the face in the vertical direction in the predetermined real space, s represents the size of the sensor in the vertical direction, and m represents the number of pixels of the sensor in the vertical direction. However, a may represent the size of the face in the horizontal direction in the real space, s may represent the size of the sensor in the horizontal direction, and m may represent the number of pixels of the sensor in the horizontal direction. The distance d is calculated from the camera position and the position of the object in the real space. In this embodiment, the region of the object on the image is assumed to be a square. However, the present invention is not limited to this and, for example, a rectangle, a circle, an ellipse, or the like may be used. Note that a value such as the sharpness of the image of the object or the intensity of a high-frequency component included in the image of the object may be used as the resolution. Alternatively, the resolution may be calculated from information other than the information of the position of the object based on image region division, a high-accuracy face detection method, or the like. The obtained resolution of the object is output to an association unit 307.

In step S405, the extraction unit 305 extracts, from the supervisory source image obtained in step S401, a region including the object, thereby obtaining a supervisory image. The extraction unit 305 automatically extracts a region (supervisory image) by, for example, applying a face detection method to the supervisory source image. The obtained supervisory image is output to the association unit 307. Note that if the positions of a plurality of objects are detected by the position obtaining unit 303, the association unit 307 associate, in step S406 to be described later, one of the resolutions of the plurality of objects calculated by the resolution calculation unit 306 with the object extracted by the extraction unit 305. To do this, the extraction unit 305 notifies the association unit 307 of the position of the extracted object in the supervisory source image. The association unit 307 determines an object corresponding to the object included in the extracted supervisory image based on the position sent from the extraction unit 305 and the positions of the plurality of objects in the real space obtained by the position obtaining unit 303. Then, the association unit 307 associates the object included in the extracted supervisory image with the resolution calculated by the resolution calculation unit 306 for the determined corresponding object.

Note that the extraction unit 305 may perform extraction based on the object position in the real space calculated in steps S402 to S404 and the resolution of the object on the image. This extraction method will be described with reference to FIG. 7. Note that in this case, the extraction unit 305 receives the position of the object from the position obtaining unit 303, and receives the resolution from the resolution calculation unit 306. Furthermore, in this case, the association unit 307 can associate, as the resolution of the object included in the supervisory image, the resolution calculated by the resolution calculation unit 306 for the object adopted by the extraction unit 305 with the object.

Figure 7:
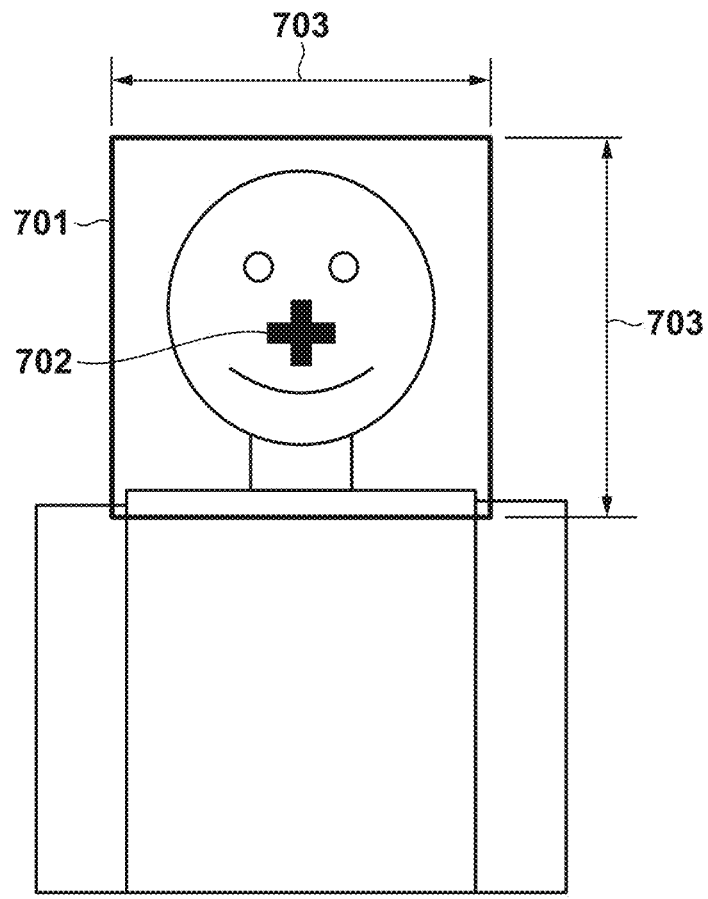
FIG. 7 is a view for explaining extraction of an image according to the first embodiment.

FIG. 7 is a view for explaining image extraction processing by the extraction unit 305 of the first embodiment using the object position in the real space and the resolution (size) of the object. To calculate an extraction frame 701 of the object, an object size 703 on the image and an object center position 702 on the image are obtained. The object size 703 on the image is calculated from the resolution of the object in the real space by equation (1). An object center position z on the image is calculated on an image coordinate system having, as an origin, the center of the supervisory source image by:

$$z = pfR \frac{(s-c)}{n \cdot (s-c)} \quad (2)$$

$$R = [n \times e_y, e_x]^T \quad (3)$$

where s represents the position of the object in the real space, c represents the position of the camera in the real space, n represents a unit vector indicating the optical axis direction of the camera, and $e_y$ represents a unit vector indicating y-axis direction of the image, all of which are vectors having three elements. Furthermore, f represents the focal length, p represents the number of pixels per unit distance on the image sensor, and R represents a 2×3 transformation matrix for transformation from a world coordinate system into a camera coordinate system. The optical axis of the camera passes through the center of an input source image.

Figure 8:
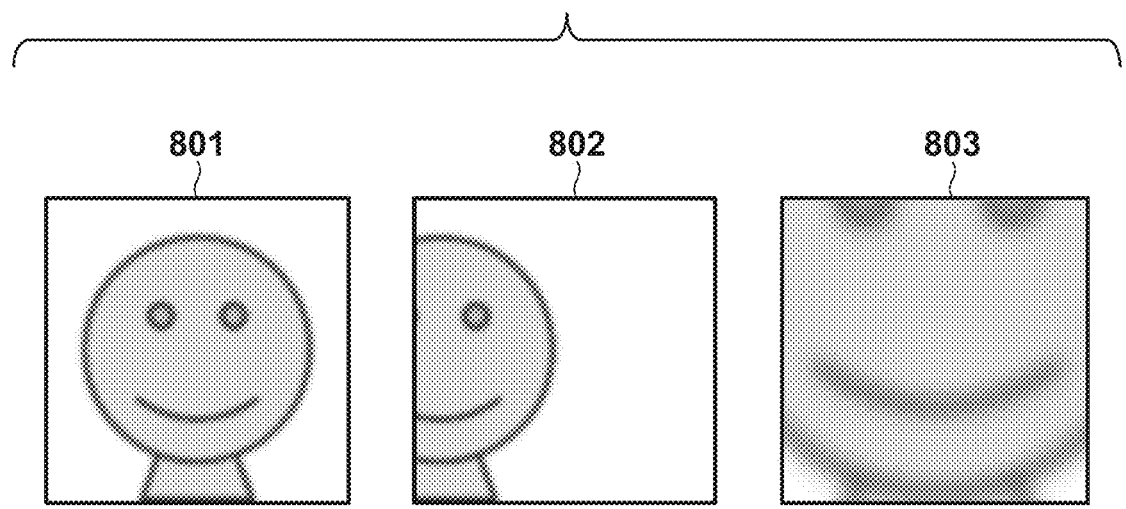
FIG. 8 is a view showing an example of nonuniform extraction of an image.

Occurrence of nonuniform extraction can be suppressed by correctly calculating an extraction frame. FIG. 8 is a view for explaining nonuniform extraction of an object from an image. An image 801 shows an example of preferable extraction in which the object is located at the center in an appropriate size. An image 802 shows an example in which a region is extracted so that the object exists at a position deviated from the image center. An image 803 shows an example in which the object is too large with respect to the extraction frame. In the above-described extraction processing, occurrence of nonuniform extraction is suppressed, and appropriate extraction as indicated by the image 801 can uniformly be performed. This can reduce the learning cost and improve the accuracy.

Note that if only the object is captured by the image capturing apparatus or if an image of only a region including the object is extracted from the storage unit 204, it is unnecessary to perform extraction. In this case, the supervisory source image is used as the supervisory image and the input source image is used as the input image.

In step S406, the association unit 307 creates a data pair by pairing the supervisory image extracted in step S405 and its resolution (the resolution is calculated in step S404), and outputs the created data pair to a data set generation unit 308. In step S407, the data set generation unit 308 generates a deteriorated image by reducing the resolution of the supervisory image received from the association unit 307, and obtains the resolution of the object in the generated deteriorated image, thereby generating a data set. The data set generation unit 308 generates the resolution of the object in the deteriorated image based on the resolution of the object in the supervisory image, which has been received from the association unit 307, and a change amount of the resolution by the resolution reduction processing. The data set includes a plurality of learning data.

FIG. 9 is a view showing examples of the learning data forming the data set. The data set generation unit 308 obtains a deteriorated image 902 by performing processing of reducing the resolution of a supervisory image 903 provided from the extraction unit 305 to the resolution of the input image. To reduce the resolution, an area averaging method of reducing the image by setting the average of a plurality of pixel values of the supervisory image as the pixel value of the deteriorated image can be used. The resolution (the number of pixels) of the object as a result of reduction is set as information 901 (resolution=20 in the example shown in FIG. 9) of the resolution of the object on the deteriorated image. Note that the resolution may be reduced based on an interpolation method such as a bicubic method or a method of reproducing a process of capturing a supervisory image at a short focal length. Furthermore, the resolution of the object on the deteriorated image may be obtained by [resolution of object on supervisory image]/n when, for example, the deteriorated image is generated by reducing the resolution of the supervisory image to 1/n.

A set of three data of the obtained resolution of the deteriorated image, the deteriorated image, and the supervisory image will be referred to as learning data hereinafter, and a set of the learning data generated for the respective input supervisory images will be referred to as a data set hereinafter. Information for explaining the property of the image like the resolution in this example will be referred to as additional information hereinafter. By reducing the resolution of the supervisory image 903 to another resolution, a deteriorated image 905 different from the deteriorated image 902 is obtained, and another learning data is obtained. For example, the deteriorated image 902 is an image obtained by reducing the resolution of the supervisory image 903 to the resolution=20, and the deteriorated image 905 is an image obtained by reducing the resolution of the supervisory image 903 to the resolution=50. This obtains a data set including learning data of the supervisory image 903, the deteriorated image 902, and the resolution information 901 (=20) and learning data of the supervisory image 903, the deteriorated image 905, and resolution information 904 (=50).

At the time of generating a data set, a deteriorated image of each resolution which can exist as the input image is generated. For example, when Λ represents a set of candidates of the resolution of the input image, the data set generation unit 308 randomly selects a given resolution $r \in \Lambda$ when generating learning data, and reduces the resolution to the resolution r to generate a deteriorated image. Note that data extension of generating a plurality of deteriorated images having different resolutions based on one supervisory image and generating a plurality of learning data is performed. The present invention, however, is not limited to this, and a different supervisory image may be used for each resolution. Alternatively, deteriorated images may be generated for all elements (resolutions) of Λ, and learning data the number of which is equal to the number of elements of Λ may be generated based on one supervisory image. The generated data set is output to the learning unit 309.

In step S408, the learning unit 309 causes a convolutional neural network to learn each learning data of the data set. The learning unit 309 includes the convolutional neural network that receives two input data of the deteriorated image and the additional information of the learning data and outputs the supervisory image of the learning data. If the deteriorated image is input to the convolutional neural network, an image feature is extracted by a plurality of convolutional layers, and a high-resolution image is estimated in accordance with the feature. The additional information as the other input data is added to the extracted image feature, and used as an estimation clue.

Note that if a neural network in which the size of an input image is restricted is used, the deteriorated image and the supervisory image are enlarged/reduced by, for example, the bicubic method, and then applied to the above learning processing. Note also that the enlargement/reduction algorithm is not limited to the bicubic method and, for example, a bilinear method, a cosine method, or the like may be used. The weight parameter of the learned neural network is input to the resolution increase unit 310.

The resolution increase processing of the input image by estimation processing using the neural network learned by the learning unit 309 will be described next with reference to the flowchart shown in FIG. 4B. Note that processes in steps S411 to S415 are similar to those in steps S401 to S405, and are processes obtained by replacing the image capturing apparatus 105 with the image capturing apparatus 101, the supervisory source image with the input source image, and the supervisory image with the input image.

In step S411, an input source image obtaining unit 302 obtains the input source image from the storage unit 204 or the image capturing apparatus 101 that captures the object at a low resolution. The obtained supervisory source image and input source image are supplied to the extraction unit 305. In step S412, the position obtaining unit 303 obtains the position of the object in the real space in the input source image by processing similar to that in step S402. In step S413, the parameter obtaining unit 304 obtains camera parameters such as the focal length and the camera position with respect to the image capturing apparatus 101 that has captured the input source image. The parameter obtaining unit 304 outputs the obtained camera parameters to the resolution calculation unit 306.

In step S414, based on the camera parameters and the position of the object in the real space, the resolution calculation unit 306 calculates the resolution of the object on the input source image captured by the image capturing apparatus 101. Details of the processing are similar to those in step S404. The calculated resolution is output to the association unit 307. In step S415, by processing similar to that in step S405, the extraction unit 305 extracts a region including the object from the input source image obtained in step S411, thereby obtaining an input image. The extraction unit 305 automatically extracts a region (input image) by applying the face detection method to the input source image. The obtained input image is output to the association unit 307.

In step S416, the association unit 307 creates an input data pair by pairing the input image extracted in step S415 and its resolution (the resolution is calculated in step S414). The association unit 307 outputs the created input data pair to the resolution increase unit 310. In step S417, the resolution increase unit 310 performs the resolution increase processing of the input image by the neural network using the weight parameter learned in the learning processing shown in FIG. 4A. Assume that the structure of the neural network is the same as that used by the learning unit 309. That is, the resolution increase unit 310 inputs the input data pair (the pair of the input image and the resolution of the object) obtained by the association unit 307 to the neural network set with the learned weight parameter, and generates and outputs a corresponding high-resolution image. Note that if the neural network in which the size of the input image is restricted is used, the input image is enlarged/reduced, similar to the learning unit 309.

As described above, according to the first embodiment, it is possible to accurately increase the resolution of an input image of an object obtained by a given image capturing apparatus by the estimation processing based on learning using a high-resolution supervisory image obtained by another image capturing apparatus. Even if input images include images having various resolutions, it is possible to correctly estimate a high-resolution image by providing information of the resolution to the neural network.

Second Embodiment

The first embodiment has explained the example in which a function of mapping a supervisory image and a pair of a deteriorated image and additional information is obtained at the time of learning, and a pair of an input image and additional information is input at the time of estimation, thereby increasing the resolution. However, in terms of the structure of the neural network, it may be difficult to use image data represented by a tensor and additional information represented by a scalar as inputs of the same level. To cope with this, the second embodiment will describe an arrangement in which a plurality of neural networks each of which receives only an image are juxtaposed in accordance with a type represented by additional information.

Figure 10:
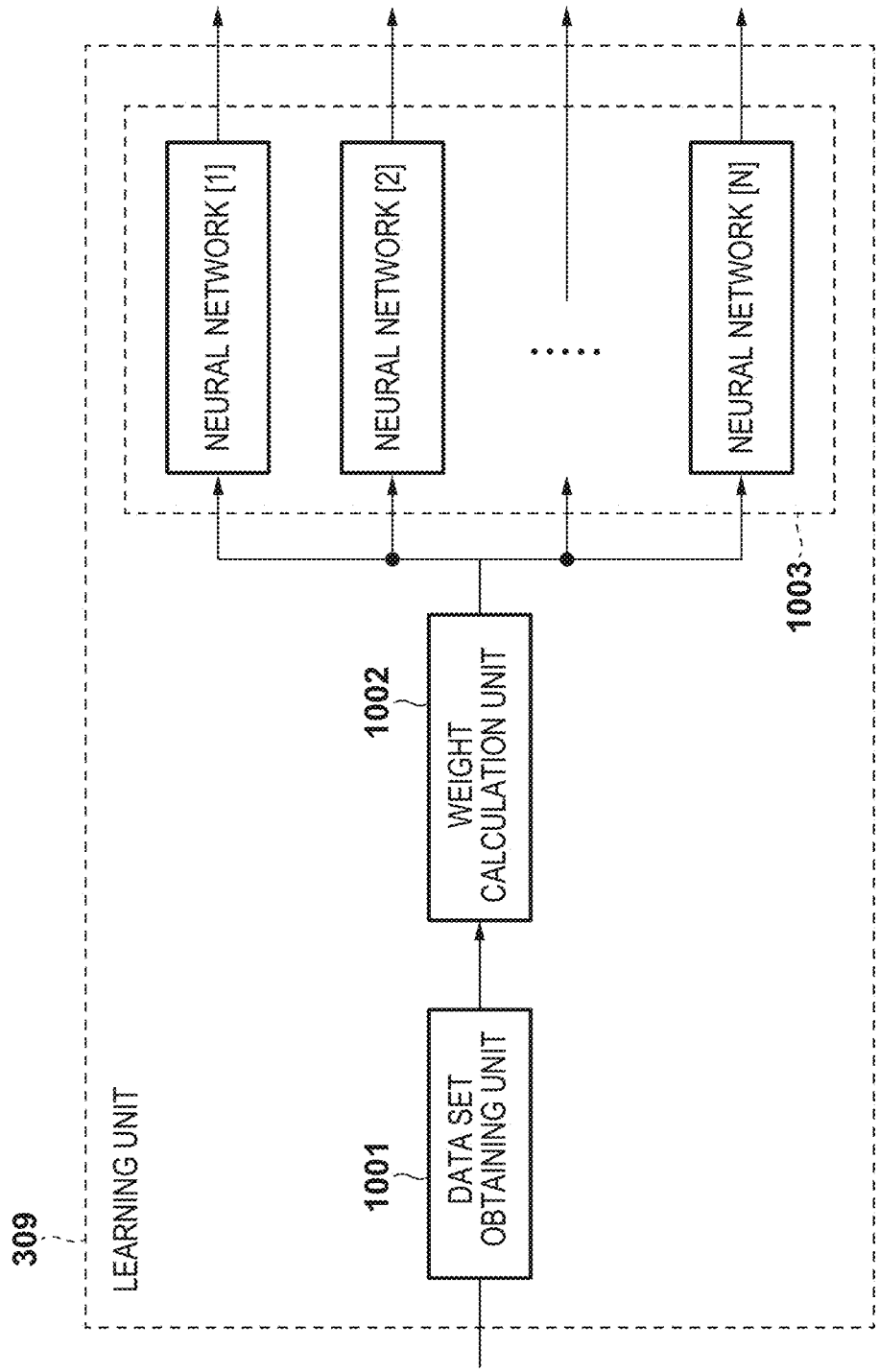
FIG. 10 is a block diagram showing an example of the functional arrangement of a learning unit according to the second embodiment.

The arrangement of a learning unit 309 according to the second embodiment will be described below with reference to FIG. 10. FIG. 10 is a block diagram showing an example of the functional arrangement of the learning unit 309 according to the second embodiment. The learning unit 309 internally holds a plurality of neural networks (a neural network group 1003). Each neural network of the neural network group 1003 exclusively learns learning data of a specific resolution. This resolution will be referred to as an assigned resolution hereinafter. For example, in the second embodiment, the assigned resolution of neural network [1] is 20, that of neural network [2] is 30, and that of neural network [3] is 40.

A data set obtaining unit 1001 obtains a data set generated by a data set generation unit 308. For each learning data of the data set, a weight calculation unit 1002 compares additional information with the assigned resolution of each neural network, and assigns a weight value which is larger as a similarity is higher. For example, for learning data of a resolution of 20, calculation is performed so that a weight value=1.0 for neural network [1], a weight value=0.5 for neural network [2], and a weight value=0.3 for neural network [3] are obtained. The obtained weight values are output to the neural network group 1003 together with the learning data.

Each neural network of the neural network group 1003 learns the weight parameter of a function of mapping a supervisory image and a deteriorated image in the learning data. At this time, the number of times the neural network performs learning is increased for the learning data with the larger weight value. Note that if the weight value is equal to or smaller than a given threshold, the neural network need not perform learning. Furthermore, as the weight value is smaller, the learning ratio of the neural network may be decreased. In this way, in the learning unit 309, as the assigned resolution of the neural network is closer to the resolution of the object on the deteriorated image, the influence of learning based on the deteriorated image and its supervisory image in the neural network is larger.

A resolution increase unit 310 includes a neural network group including neural networks the number of which is at least equal to that of neural networks of the neural network group 1003 of the learning unit 309. At the time of estimation, the resolution increase unit 310 inputs an input image included in an input data pair to a neural network of an assigned resolution equal to a resolution included in the input data pair, and then increases the resolution.

Note that one neural network may have a plurality of assigned resolutions. For example, neural network [1] may learn learning data of resolutions 20 to 29, and neural network [2] may learn learning data of resolutions 30 to 39. Alternatively, the assigned resolution of each neural network may be decided based on information of the resolution of the input image obtained by a resolution calculation unit. For example, the assigned resolution of each neural network may be decided so as to equally divide the interval between the minimum value and the maximum value of the resolution.

As described above, according to the second embodiment, it is unnecessary to input two kinds of amounts of a tensor and a scalar to one neural network at the same time. As a result, the neural network can use these two pieces of information more correctly, thereby improving the accuracy of the resolution increase processing.

Third Embodiment

The first embodiment has explained the method of improving the accuracy of the resolution increase processing by using the resolution of the object as additional information for explaining the property of each of the input image and the supervisory image to be input to the learning unit 309 and the resolution increase unit 310. The third embodiment will describe an arrangement in which additional information other than a resolution is used as additional information.

Figure 12A:
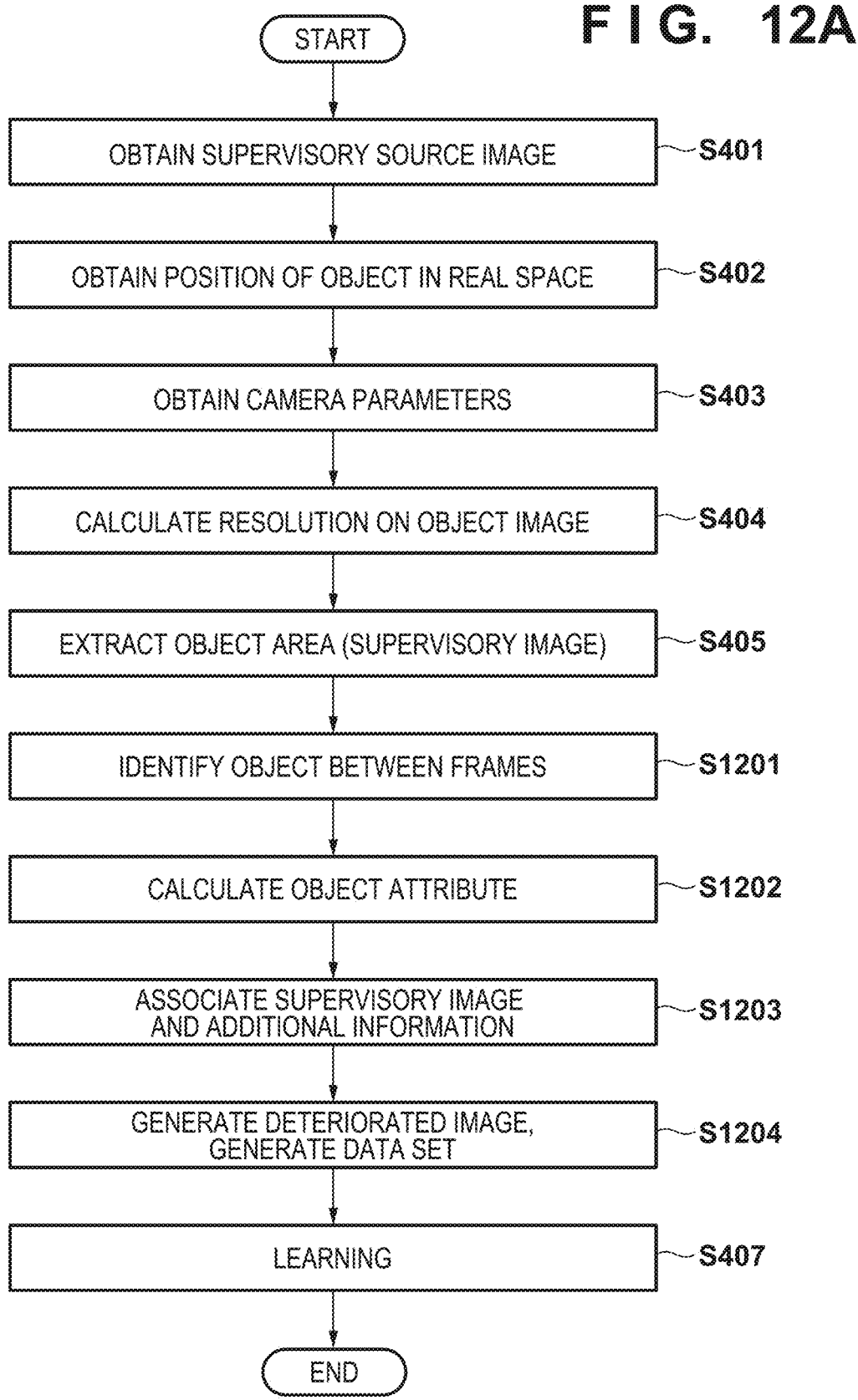
FIG. 12A is a flowchart illustrating learning processing by the image processing apparatus according to the third embodiment.
Figure 12B:
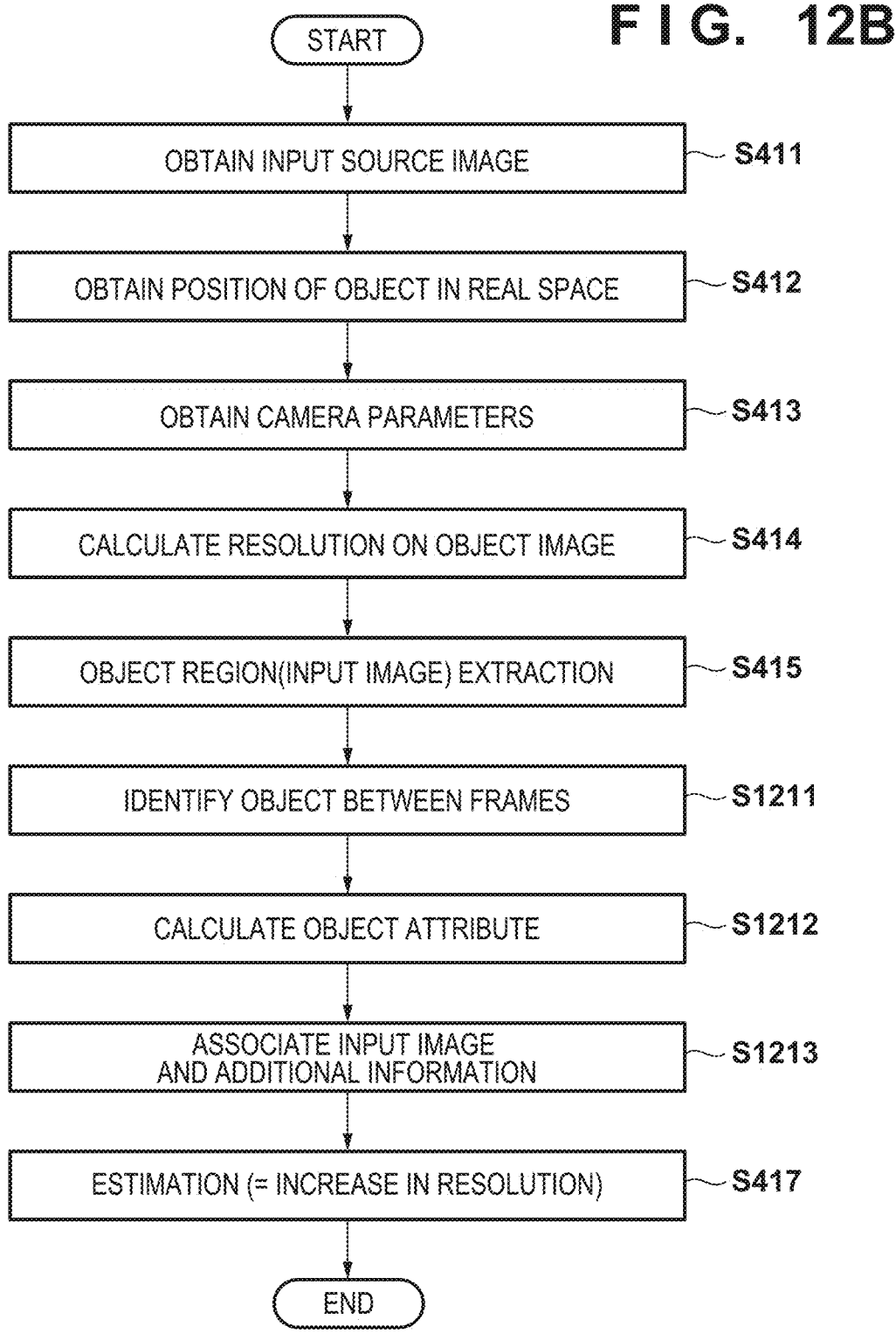
FIG. 12B is a flowchart illustrating estimation processing by the image processing apparatus according to the third embodiment.

FIG. 11 is a block diagram showing an example of the functional arrangement of an image processing apparatus 102 according to the third embodiment. FIG. 12A is a flowchart illustrating learning processing by the image processing apparatus 102 according to the third embodiment. FIG. 12B is a flowchart illustrating estimation processing (resolution increase processing) by the image processing apparatus 102 according to the third embodiment. The learning processing and the resolution increase processing of the image processing apparatus 102 according to the third embodiment will be described below with reference to FIGS. 11, 12A, and 12B. As additional information includes more data, it is possible to teach, in more detail, a resolution increase unit 310 how the resolution of an input image is increased, thereby improving the accuracy. Note that a description of a hardware arrangement, a functional arrangement, and processing common to the first embodiment will be omitted.

In step S1201 if a plurality of objects are captured at a plurality of times, an identification unit 1101 identifies each object, and assigns an object ID (identification information of the object). In the first embodiment, even if the position of the observed object is calculated, it is unknown whether the object is the same person as an object at another time. In the third embodiment, a person is identified by tracking, a unique ID is assigned to each object, and the ID is output to an attribute obtaining unit 1102 and an association unit 1103. Note that to identify a person, for example, a known technique can be used. For example, face identification or a sensor capable of identifying a person, such as a GPS, can be used. An identification result (object ID) is output to the attribute obtaining unit 1102 and the association unit 1103.

In step S1202, the attribute obtaining unit 1102 associates the object ID with object attributes. If, for example, the object is an athlete, the object attributes are pieces of information of a belonging team, a race, an age, a position, and the like. For example, the attribute obtaining unit 1102 creates, in advance, a database in which the object attributes are registered using a uniform number as a key. The attribute obtaining unit 1102 recognizes a uniform number by image recognition, refers to the database, and associates, with the object ID, the object attributes registered in correspondence with the recognized uniform number. Note that the key of the database is not limited to the uniform number and, for example, the face of a person may be used. The attribute obtaining unit 1102 outputs, to the association unit 1103, the object attributes corresponding to the object ID.

In step S1203, the association unit 1103 creates a set of a supervisory image extracted in step S405, and the object ID and object attributes as additional information of the supervisory image, and outputs the created set to a data set generation unit 308. Note that a method of determining one of the object IDs of the plurality of objects and their object attributes which are associated with the object of the supervisory image can be implemented by a method similar to that of associating the resolution with the object of the supervisory image in the first embodiment. In step S1204, the data set generation unit 308 generates a deteriorated image from the supervisory image, and obtains the resolution of the object on the deteriorated image based on the resolution of the object on the supervisory image, thereby generating learning data. That is, the learning data includes the supervisory image, the deteriorated image obtained by degrading the supervisory image, and additional information of the deteriorated image. The additional information includes the object ID and the object attributes in addition to the same resolution information as in the first embodiment. Note that the object ID and the object attributes are the same values as those of the additional information obtained for the supervisory image in steps S1201 and S1202. In step S407, a learning unit 309 performs learning of a neural network using a data set generated by the data set generation unit 308.

The estimation processing by the resolution increase unit 310 according to the third embodiment will be described next with reference to the flowchart shown in FIG. 12B. Note that processes in steps S1211 to S1213 are similar to those in steps S1201 to S1203, and are processes obtained by replacing the image capturing apparatus 105 with an image capturing apparatus 101, a supervisory source image with an input source image, and the supervisory image with the input image.

In step S1211, if a plurality of objects are captured at a plurality of times, the identification unit 1101 identifies each object, assigns an object ID, and outputs the object ID to the attribute obtaining unit 1102 and the association unit 1103.

In step S1212, the attribute obtaining unit 1102 associates the object ID with the object attributes. In step S1213, the association unit 1103 creates a set of an input image extracted in step S415, and the object ID and object attributes as additional information of the input image, and outputs the created set to the resolution increase unit 310. In step S417, the resolution increase unit 310 increases the resolution of the input image by a neural network using a weight parameter learned in the learning processing shown in FIG. 12A. Assume that the structure of the neural network is the same as that used by the learning unit 309. That is, the resolution increase unit 310 inputs the input data pair (the pair of the input image and the additional information (the resolution, the object ID, and the object attributes)) obtained by the association unit 1103 to the neural network (learned model) set with the learned weight parameter, and generates and outputs a high-resolution image.

The above-described object ID and object attributes are important pieces of information for explaining the object included in the input image, contributing to improvement of the accuracy of the resolution increase processing. Note that the additional information for explaining the input image is not limited to the above example. For example, the moving direction of the object, the altitude of the object from the ground, or an illumination condition at the time of image capturing may be used as the additional information. The moving direction of the object can be calculated by obtaining the difference in position between adjacent frames based on the tracking result of the object. As the illumination condition at the time of image capturing, information of the presence/absence of sunshine, a light source direction, a light source intensity, or the like can be used.

Note that the additional information need not include all the above pieces of information, and only some of them may be used. The additional information in the third embodiment may be used as that in the second embodiment. If the additional information is formed by a plurality of kinds of information, the additional information is regarded as a vector. For example, at the time of learning, the weight value of learning is set based on the similarity between the vector of the additional information (assigned additional information) assigned to each neural network and the vector of the additional information of the supervisory image. Then, at the time of estimation, a neural network set with assigned additional information having the highest similarity with respect to the vector of the additional information of the input image is used to increase the resolution of the input image.

As described above, according to the third embodiment, in learning of the neural network and processing of increasing the resolution of the image using the neural network, information for specifying the object and the attribute information of the object are used in addition to the resolution of the object on the image. Therefore, it is possible to perform more accurate estimation (resolution increase processing).

As described above, according to each of the above-described embodiments, it is possible to improve the accuracy of the processing of increasing the resolution of the input image based on machine learning.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-109623, filed Jun. 12, 2019, which is hereby incorporated by reference herein in its entirety.

What is claimed is:

1. An image processing apparatus comprising:
   one or more memories storing instructions; and
   one or more processors configured to execute the instructions to:
   obtain a first image of a first object based on image capturing by an image capturing apparatus;
   obtain a parameter concerning a resolution of the first object in the first image; and
   generate a second image of the first object in which a resolution of the first object in the second image is higher than the resolution of the first object in the first image based on input data including the obtained first image and the obtained parameter concerning the resolution of the first object in the first image, wherein
   the generated second image is an image output as a result of inputting the input data including the first image and the parameter concerning the resolution of the first object in the first image to a learned model, and
   the learned model is generated based on a third image of a second object, a fourth image of the second object in which a resolution of the second object in the fourth image is lower than a resolution of the second object in the third image, and a parameter concerning the resolution of the second object in the fourth image.

2. The apparatus according to claim 1, wherein the learned model is generated by machine learning using the third image, the fourth image, and the parameter concerning the resolution of the second object in the fourth image.

3. The apparatus according to claim 1, wherein the fourth image is obtained by performing image processing of reducing the resolution of the second object in the third image.

4. The apparatus according to claim 3, wherein the parameter concerning the resolution of the second object in the fourth image is obtained based on a parameter concerning the resolution of the second object in the third image and a degree of reduction of the resolution of the second object in the image processing.

5. The apparatus according to claim 2, wherein in the machine learning, a set of the third image, the fourth image, and the parameter concerning the resolution of the second object in the fourth image is input to a plurality of neural networks in accordance with weight values determined based on the parameter concerning the resolution of the second object in the fourth image.

6. An image processing apparatus comprising:
   one or more memories storing instructions; and
   one or more processors configured to execute the instructions to:
   obtain a first image of a first object based on image capturing by an image capturing apparatus;
   obtain a parameter concerning a resolution of the first object in the first image; and
   generate a second image of the first object in which a resolution of the first object in the second image is higher than the resolution of the first object in the first image based on input data including the obtained first image and the obtained parameter concerning the resolution of the first object in the first image,
   wherein the parameter concerning the resolution of the first object in the first image represents at least one of the resolution of the first image, a resolving power of an image capturing apparatus used to obtain the first image, and a distance between the first object and the image capturing apparatus used to obtain the first image.

7. An image processing apparatus comprising:
   one or more memories storing instructions; and
   one or more processors configured to execute the instructions to:
   obtain a first image of a first object based on image capturing by an image capturing apparatus;
   obtain a parameter concerning a resolution of the first object in the first image; and
   generate a second image of the first object in which a resolution of the first object in the second image is higher than the resolution of the first object in the first image based on input data including the obtained first image and the obtained parameter concerning the resolution of the first object in the first image,
   wherein the first object in the first image is obtained by extracting a partial image corresponding to the first object from the first image captured by the image capturing apparatus.

8. The apparatus according to claim 7, wherein a size of the extracted partial image is determined based on a resolving power of the image capturing apparatus and a position of the first object.

9. An image processing apparatus comprising:
   one or more memories storing instructions; and
   one or more processors configured to execute the instructions to:
   obtain a first image of a first object based on image capturing by an image capturing apparatus;
   obtain a parameter concerning a resolution of the first object in the first image; and
   perform resolution increase processing that generates a second image of the first object in which a resolution of the first object in the second image is higher than the resolution of the first object in the first image based on input data including the obtained first image and the obtained parameter concerning the resolution of the first object in the first image, wherein a plurality of processed images are generated by performing the resolution increase processing for each of a plurality of images based on image capturing by a plurality of image capturing apparatuses at different positions, and the plurality of processed images are used to generate a virtual viewpoint image corresponding to a position and a direction of a designated virtual viewpoint.

10. The apparatus according to claim 9, wherein the plurality of image capturing apparatuses include image capturing apparatuses whose lenses have different focal lengths.

11. The apparatus according to claim 1, wherein the generated second image is an image output as a result of inputting the input data including the first image, the parameter concerning the resolution of the first object in the first image, and identification information and/or attribute information of the first object to the learned model.

12. The apparatus according to claim 1, wherein the learned model is generated further based on identification information and/or attribute information of the second object.

13. An image processing apparatus comprising:
one or more memories storing instructions; and
one or more processors configured to execute the instructions to:
obtain a first image of a first object based on image capturing by an image capturing apparatus;
obtain a parameter concerning a resolution of the first object in the first image; and
generate a second image of the first object in which a resolution of the first object in the second image is higher than the resolution of the first object in the first image based on input data including the obtained first image and the obtained parameter concerning the resolution of the first object in the first image, wherein
the generated second image is an image output as a result of inputting the input data including the first image, the parameter concerning the resolution of the first object in the first image, and additional information to a learned model, and
the additional information includes at least one of a height of the first object from the ground, a moving direction of the first object, and an illumination condition at the time of image capturing by the image capturing apparatus.

14. The apparatus according to claim 1, wherein
the learned model is generated further based on additional information, and
the additional information includes at least one of a height of the second object from the ground, a moving direction of the second object, and an illumination condition at the time of image capturing by the image capturing apparatus.

15. An image processing method comprising:
obtaining a first image of a first object based on image capturing by an image capturing apparatus;
obtaining a parameter concerning a resolution of the first object in the first image; and
generating a second image of the first object in which a resolution of the first object in the second image is higher than the resolution of the first object in the first image based on input data including the obtained first image and the obtained parameter concerning the resolution of the first object in the first image, wherein
the generated second image is an image output as a result of inputting the input data including the first image and the parameter concerning the resolution of the first object in the first image to a learned model, and
the learned model is generated based on a third image of a second object, a fourth image of the second object in which a resolution of the second object in the fourth image is lower than a resolution of the second object in the third image, and a parameter concerning the resolution of the second object in the fourth image.

16. The method according to claim 15, wherein the learned model is generated by machine learning using the third image, the fourth image, and the parameter concerning the resolution of the second object in the fourth image.

17. A non-transitory computer-readable storage medium storing a program for causing a computer to execute an image processing method, the method comprising:
obtaining a first image of a first object based on image capturing by an image capturing apparatus;
obtaining a parameter concerning a resolution of the first object in the first image; and
generating a second image of the first object in which a resolution of the first object in the second image is higher than the resolution of the first object in the first image based on input data including the obtained first image and the obtained parameter concerning the resolution of the first object in the first image, wherein
the generated second image is an image output as a result of inputting the input data including the first image and the parameter concerning the resolution of the first object in the first image to a learned model, and
the learned model is generated based on a third image of a second object, a fourth image of the second object in which a resolution of the second object in the fourth image is lower than a resolution of the second object in the third image, and a parameter concerning the resolution of the second object in the fourth image.

18. The apparatus according to claim 1, wherein the resolution of the first object in the first image is based on a number of pixels existing in an area of the first object in the first image.

* * * * *